(12) United States Patent
Holland et al.

(10) Patent No.: US 8,892,644 B2
(45) Date of Patent: Nov. 18, 2014

(54) METHOD OF ENABLING ACCESS TO DATA STRUCTURE

(75) Inventors: Joseph H. Holland, Barrington, IL (US); Mark W. Byrd, Downingtown, PA (US)

(73) Assignee: SecureSheet Technologies, LLC, Raleigh, NC (US)

( * ) Notice: Subject to any disclaimer, the term of this patent is extended or adjusted under 35 U.S.C. 154(b) by 1338 days.

(21) Appl. No.: 10/762,879

(22) Filed: Jan. 22, 2004

(65) Prior Publication Data

US 2005/0198325 A1    Sep. 8, 2005

(51) Int. Cl.
| | |
|---|---|
| *G06F 15/16* | (2006.01) |
| *G06F 17/24* | (2006.01) |
| *G06F 17/22* | (2006.01) |
| *G06Q 10/10* | (2012.01) |

(52) U.S. Cl.
CPC .......... *G06F 17/246* (2013.01); *G06F 17/2288* (2013.01); *G06Q 10/103* (2013.01); *G06Q 10/107* (2013.01)
USPC ............ 709/204; 709/205; 709/206; 709/217

(58) Field of Classification Search
None
See application file for complete search history.

(56) References Cited

U.S. PATENT DOCUMENTS

| | | | | |
|---|---|---|---|---|
| 5,623,591 A * | 4/1997 | Cseri | ............ | 715/762 |
| 5,669,005 A * | 9/1997 | Curbow et al. | ............ | 715/234 |
| 5,875,302 A * | 2/1999 | Obhan | ............ | 709/225 |
| 6,055,549 A * | 4/2000 | Takano | ............ | 715/219 |
| 6,138,130 A * | 10/2000 | Adler et al. | ............ | 715/210 |
| 6,157,934 A * | 12/2000 | Khan et al. | ............ | 715/234 |
| 6,460,059 B1 * | 10/2002 | Wisniewski | ............ | 715/212 |
| 6,592,626 B1 * | 7/2003 | Bauchot et al. | ............ | 715/217 |
| 6,988,241 B1 * | 1/2006 | Guttman et al. | ...... | 707/E17.115 |
| 7,000,181 B2 * | 2/2006 | Press | ............ | 715/212 |
| 7,107,519 B1 * | 9/2006 | Webster et al. | ............ | 715/212 |
| 7,251,776 B2 * | 7/2007 | Handsaker et al. | ............ | 715/212 |
| 7,296,219 B1 * | 11/2007 | Guttman et al. | ............ | 1/1 |
| 7,363,345 B2 * | 4/2008 | Austin-Lane et al. | ......... | 709/207 |
| 7,542,921 B1 * | 6/2009 | Hildreth | ............ | 705/26 |
| 7,624,339 B1 * | 11/2009 | Engel et al. | ............ | 715/214 |
| 2002/0010743 A1 * | 1/2002 | Ryan et al. | ............ | 709/205 |
| 2002/0031230 A1 * | 3/2002 | Sweet et al. | ............ | 380/278 |

OTHER PUBLICATIONS

Bott, Ed and Woody Leonhard. Using Microsoft Office 2000 Special Edition. Que Publishing, 1999. Chapter 24: Using Excel in a Workgroup. 591-612.*

* cited by examiner

*Primary Examiner* — Jeffrey R Swearingen
(74) *Attorney, Agent, or Firm* — RatnerPrestia

(57) ABSTRACT

A method of enabling access to a data structure is provided. The method includes designating e-mail addresses of users with respective sections of the data structure. The method also includes enabling access to the respective sections to users corresponding to the designated e-mail addresses.

14 Claims, 9 Drawing Sheets

Figure 1

Annual Budget By Month, XYZ Company

| | Assigned E-mail jbrown@xyz.com | Assigned E-mail mcolt@xyz.com | Assigned E-mail phart@xyz.com | Assigned E-mail skelly@xyz.com | Assigned E-mail skelly@xyz.com | Assigned E-mail | Assigned E-mail |
|---|---|---|---|---|---|---|---|
| | Office Space | Office Supplies | Human Resources | Marketing Expenses | Entertainment Expenses | Equipment Rental | Equipment Maintenance |
| January | | | | | | | |
| February | | | | | | | |
| March | | | | | | | |
| April | | | | | | | |
| May | | | | | | | |
| June | | | | | | | |
| July | | | | | | | |
| August | | | | | | | |
| September | | | | | | | |
| October | | | | | | | |
| November | | | | | | | |
| December | | | | | | | |

Figure 2

Annual Budget By Month, Human Resources

| Assigned E-mail | Assigned E-mail | Assigned E-mail | Assigned E-mail | Assigned E-mail | Assigned E-mail | Assigned E-mail |
|---|---|---|---|---|---|---|
| phart@xyz.com | phart@xyz.com | jyu@xyz.com | jyu@xyz.com | jyu@xyz.com | cbarns@xyz.com | cbarns@xyz.com |
| Salaried Management | Salaried Engineering | Hourly Maintenance | Hourly Operations | Hourly Secretarial | Union Contractors | Non-Union Contractors |
| January | | | | | | |
| February | | | | | | |
| March | | | | | | |
| April | | | | | | |
| May | | | | | | |
| June | | | | | | |
| July | | | | | | |
| August | | | | | | |
| September | | | | | | |
| October | | | | | | |
| November | | | | | | |
| December | | | | | | |

Figure 3

Annual Budget By Month, XYZ Company

| Assigned E-mail | Budget Area | Jan | Feb | Mar | Apr | May | Jun | Jul | Aug | Sep | Oct | Nov | Dec |
|---|---|---|---|---|---|---|---|---|---|---|---|---|---|
| jbrown@xyz.com | Office Space | | | | | | | | | | | | |
| mcolt@xyz.com | Office Supplies | | | | | | | | | | | | |
| phart@xyz.com | Human Resources | | | | | | | | | | | | |
| phart@xyz.com | …Salaried Management | | | | | | | | | | | | |
| phart@xyz.com | …Salaried Engineering | | | | | | | | | | | | |
| jyu@xyz.com | …Hourly Maintenance | | | | | | | | | | | | |
| mbyrd@xyz.com | …..East Coast | | | | | | | | | | | | |
| jgeorgae@xyz.com | …..West Coast | | | | | | | | | | | | |
| jyu@xyz.com | …Hourly Operations | | | | | | | | | | | | |
| jyu@xyz.com | …Hourly Secretarial | | | | | | | | | | | | |
| cbarns@xyz.com | …Union Contractors | | | | | | | | | | | | |
| cbarns@xyz.com | …Non-Union Contractors | | | | | | | | | | | | |
| skelly@xyz.com | Marketing Expenses | | | | | | | | | | | | |
| skelly@xyz.com | Entertainment Expenses | | | | | | | | | | | | |
| | Equipment Rental | | | | | | | | | | | | |
| | Equipment Maintenance | | | | | | | | | | | | |

Figure 5

Annual Budget By Month, XYZ Company

| Linking Field<br>jbrown@xyz.com | | | | | | | |
|---|---|---|---|---|---|---|---|
| | Office Space | Office Supplies | Human Resources | Marketing Expenses | Entertainment Expenses | Equipment Rental | Equipment Maintenance |
| January | | | | | | | |
| February | | | | | | | |
| March | | | | | | | |
| April | | | | | | | |
| May | | | | | | | |
| June | | | | | | | |
| July | | | | | | | |
| August | | | | | | | |
| September | | | | | | | |
| October | | | | | | | |
| November | | | | | | | |
| December | | | | | | | |

Figure 6

Annual Budget By Month, XYZ Company

Linking Field: whoyt@xyz.com

|  | Office Space | Office Supplies | Human Resources | Marketing Expenses | Entertainment Expenses | Equipment Rental | Equipment Maintenance |
|---|---|---|---|---|---|---|---|
| January |  |  |  |  |  |  |  |
| February |  |  |  |  |  |  |  |
| March |  |  |  |  |  |  |  |
| April |  |  |  |  |  |  |  |
| May |  |  |  |  |  |  |  |
| June |  |  |  |  |  |  |  |
| July |  |  |  |  |  |  |  |
| August |  |  |  |  |  |  |  |
| September |  |  |  |  |  |  |  |
| October |  |  |  |  |  |  |  |
| November |  |  |  |  |  |  |  |
| December |  |  |  |  |  |  |  |

US 8,892,644 B2

METHOD OF ENABLING ACCESS TO DATA STRUCTURE

FIELD OF THE INVENTION

This invention relates to a method of enabling access to a data structure, and more particularly, to using e-mail addresses of users to enable access to sections of the data structure.

BACKGROUND OF THE INVENTION

In the preparation of electronic documents, multiple users often collaborate on a single document. For example, in certain industrial environments, multiple individuals may be responsible for entering or maintaining data in varying sections of a single electronic document.

Typically, such an electronic document is distributed to the multiple users. Each of the users updates the section of the document for which they have responsibility. After each of the users performs their update, all of the updates must be consolidated into a single version of the electronic document. The task of consolidating the updates is often tedious, time-consuming, and error-prone.

An alternative approach is to distribute a single electronic document to the users, one user at a time. In such a scenario, after one user completes their update, the updated electronic document is provided to another user, and so on, until each of the users has been able to update their respective section of the document. This approach is undesirably time-consuming, as each of the users waits for their turn to access the electronic document. Further, because each user updates their respective portion of the electronic document at a different time, the finished document may not reflect the present status of the data included in the document.

SUMMARY OF THE INVENTION

A method of enabling access to a data structure is provided. The method includes designating e-mail addresses of users with respective sections of the data structure. The method also includes enabling access to the respective sections to users corresponding to the designated e-mail addresses.

BRIEF DESCRIPTION OF THE DRAWINGS

Exemplary embodiments of the invention will be described with reference to the drawings, of which:

FIG. 1 is an illustration of a portion of a data structure in accordance with an exemplary embodiment of the present invention;

FIG. 2 is an illustration of another portion of the data structure illustrated in FIG. 1;

FIG. 3 is another illustration of a portion of a data structure in accordance with another exemplary embodiment of the present invention;

FIG. 5 is another illustration of a portion of a data structure in accordance with another exemplary embodiment of the present invention;

FIG. 6 is yet another illustration of a portion of a data structure in accordance with another exemplary embodiment of the present invention;

DETAILED DESCRIPTION OF THE INVENTION

Figure 4:
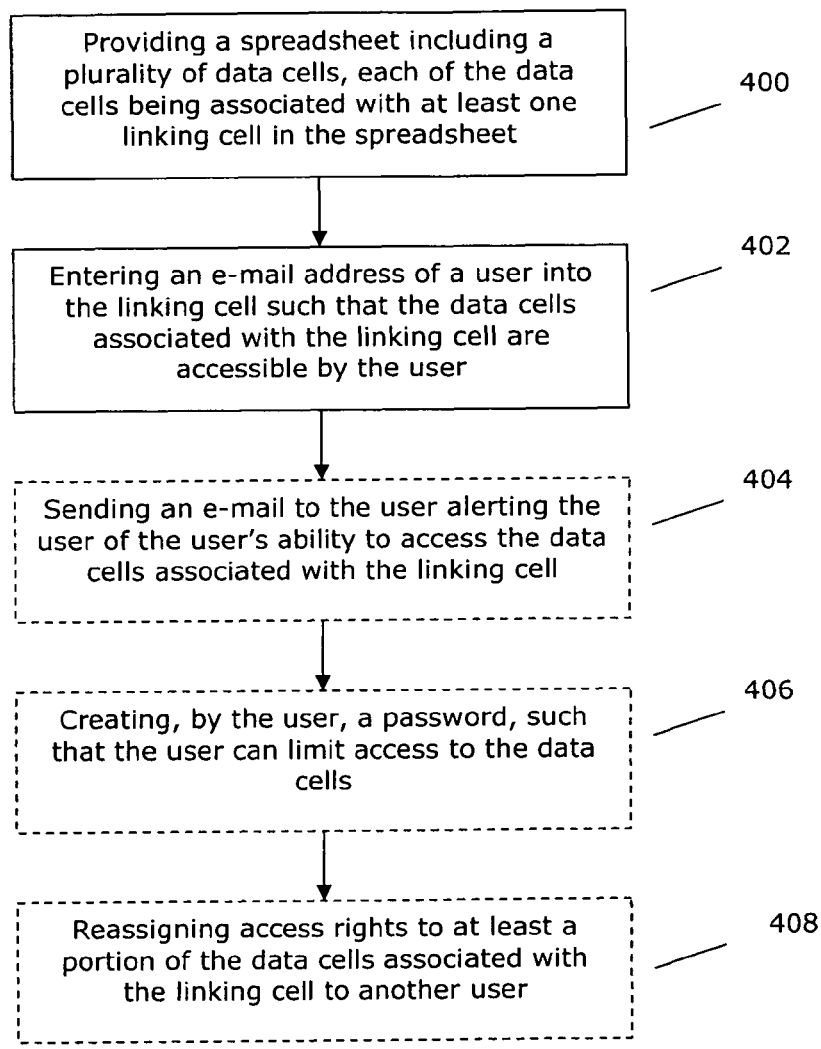
FIG. 4 is a flow diagram illustrating a method of enabling access to a data structure in accordance with an exemplary embodiment of the present invention.

Preferred features of embodiments of this invention will now be described with reference to the figures. It will be appreciated that the spirit and scope of the invention is not limited to the embodiments selected for illustration. It is contemplated that any of the configurations described hereafter can be modified within the scope of this invention.

Referring to the Figures generally, the present invention relates to associating e-mail addresses of users with sections of a data structure (e.g., a spreadsheet). Through this association, each of the users is able to access the sections of the data structure (e.g., data cells in the spreadsheet) associated with his/her e-mail address.

Referring now to FIG. 1, a spreadsheet is provided which summarizes the annual budget of XYZ Company. Each of a number of budget areas of the company (i.e., Office Space, Office Supplies, Human Resources, Marketing Expenses, Entertainment Expenses, Equipment Rental, and Equipment Maintenance) are assigned a column in the spreadsheet. Each of these budget areas includes a data cell for each month of the year. For example, the monthly budget of the budget area is intended to be entered into this data cell. Above each budget area column is an "Assigned E-mail" data cell. By entering an e-mail address of a user into the "Assigned E-mail" data cell, the user corresponding to the e-mail address is given access to the data cells in the budget area column. As such, John Brown (i.e., the user corresponding to the e-mail address jbrown@xyz.com) has been given access rights to the data cells in the "Office Space" budget area column. Likewise Mike Colt has been given access rights to the data cells in the "Office Supplies" budget area column, Paul Hart has been given access rights to the data cells in the "Human Resources" budget area column, and Sam Kelly has been given access rights to the data cells in the "Marketing Expenses" and "Entertainment Expenses" budget area columns. As indicated by the blank "Assigned E-mail" data cells, no user has been given access rights to the data cells in the "Equipment Rental" and "Equipment Maintenance" budget area columns.

In certain embodiments of the present invention, a user may only be able to view the portion of the data structure to which the user has been provided access rights to. In such an embodiment, John Brown would only be able to see the data cells in the Office Space budget area column, Mike Colt would only be able to view the data cells in the Office Supplies budget area column, etc.

As described herein, access or access rights refers to any of a broad class of data structure access rights, for example, editing access, viewing access, creation access, and any combination thereof. As such, a user may be given access to edit a section of a data structure, to view a section of a data structure, to create a section of a data structure, and any combination thereof.

According to an exemplary embodiment of the present invention, after access rights have been assigned to a user by associating the user's e-mail address with a portion of a data structure, an e-mail may be sent to the user to notify the user of the user's access rights. Such an e-mail may be configured to be automatically transmitted upon the access rights being assigned.

After being provided with access rights to a section of a data structure, the user may establish a password such that other users may not access the section of a data structure. In certain exemplary embodiments of the present invention, higher level users may retain access rights to the section of the data structure. For example, in FIG. 1, a single user (or a group of users) may have access to the entire annual budget spreadsheet. Thus, this single user may enter e-mail addresses of other users (e.g., John Brown) into one or more of the "Assigned E-mail" data cells (e.g., the Assigned E-mail data cell corresponding to the Office Space section of the spreadsheet) in order to provide access rights to the user. In this example, John Brown has access rights to the Office Space column of cells; however, the assigning single user may also retain access rights to the Office Space column of cells.

According to an exemplary embodiment of the present invention a user may reassign all or a portion of their access rights to one or more additional users by associating the e-mail addresses of the additional users to the corresponding section of the data structure.

The data structure may be stored in any of a number of locations, for example, as a file on a personal computer or a mainframe computer. Further, the data structure may be configured in connection with a database server on a personal computer or a mainframe computer. If users access the data structure from remote locations, such access may be accomplished through any of a number of conventional connections (e.g., the Internet, other network connections, etc.). Further, in an Internet embodiment, the access connection may be facilitated through a web browser.

When connecting via a web browser, a user may be prompted for information identifying the user to restrict access from unauthorized users. For example, the identifying information may be a user ID and a password. According to the present invention, the user ID may be the e-mail address of the user, and the password is the same for all applications to which the user has been provided access.

FIG. 2 is another layer of the portion of the data structure illustrated in FIG. 1. More specifically, FIG. 2 is a spreadsheet which summarizes the annual Human Resources budget of XYZ Company. FIG. 1 indicated that Paul Hart (i.e., the user corresponding to the address phart@xyz.com) has access rights to the Human Resources budget data cells. FIG. 2 is a detail of the Human Resources budget, which may be accessed, for example, by clicking on the Human Resources tag in FIG. 1. In FIG. 2, each of a number of Human Resource budget areas (i.e., Salaried Management, Salaried Engineering, Hourly Maintenance, Hourly Operations, Hourly Secretarial, Union Contractors, and Non-Union Contractors) is assigned a column in the spreadsheet. Each of these Human Resource budget areas includes a data cell for each month of the year. As in FIG. 1, above each budget area column in FIG. 2 is an "Assigned E-mail" data cell. By entering an e-mail address of a user into the "Assigned E-mail" data cell above a given budget area column, the user corresponding to the e-mail address is given access to the data cells in the budget area column. As such, Paul Hart, who was given access to the entire Human Resources budget in FIG. 1, has retained access rights to the "Salaried Management" and "Salaried Engineering" budget area columns. However, Paul Hart has assigned access rights to other areas of the Human Resources budget to other users. For example, Javier Yu has been given access rights to the "Hourly Maintenance," "Hourly Operations," and "Hourly Secretarial" budget area columns. Likewise, Clifford Barns has been given access rights to the "Union Contractors" and "Non-Union Contractors" budget area columns. Although Paul Hart has provided access right to certain sections of the Human Resources budget to Javier Yu and Clifford Barns, Paul may also retain access rights to these areas.

FIG. 3 is a spreadsheet summarizing the annual budget of XYZ Company including data similar to that included in FIGS. 1-2. In contrast to FIGS. 1-2 where the "Assigned E-mail" cells are above each data column, the "Assigned E-mail" cells are provided in a single column in FIG. 3. Likewise, all of the "Budget Area" cells (e.g., Office Space, Office Supplies, etc.) are provided in a single column. Each of the general budget areas from FIG. 1 are also included in FIG. 3 (Office Space, Office Supplies, Human Resources, Marketing Expenses, Entertainment Expenses, Equipment Rental, and Equipment Maintenance), and each of these general budget areas have been associated with the same e-mail addresses. As such, the users corresponding to each of these e-mail addresses has access rights with respect to the budget areas. For example, John Brown can access the data cells in the Office Space budget area row.

As opposed to having one layer of the data structure in a first spreadsheet (e.g., FIG. 1 including general budget areas including Human Resources), and another layer of the data structure in a second spreadsheet (e.g., FIG. 2 detailing the Human Resources budget), FIG. 3 includes multi-layer information. Thus, within the Human Resources budget are the Salaried Management, Salaried Engineering, Hourly Maintenance, Hourly Operations, Hourly Secretarial, Union Contractors, and Non-Union Contractors budgets. Further, within the Hourly Maintenance budget is the East Coast Budget and the West Coast budget.

In the spreadsheets included in FIGS. 1-3, a "Assigned E-mail" field is provided for each row (FIG. 3) or column (FIGS. 1-2). This field may generically be called an "assignment field" or an "assignment section" because it indicates that the user has been assigned certain access rights. Alternatively, this field may be called a "linking field" or a "linking section" because it links a row or column (e.g., a budget area) to a user through the user's e-mail address.

FIG. 4 is a flow diagram illustrating a method of enabling access to a data structure where the data structure is a spreadsheet. At step 400, a spreadsheet including a plurality of data cells is provided. Each of the data cells is associated with at least one linking cell in the spreadsheet. FIGS. 1-3 are examples of such a spreadsheet. At step 402, an e-mail address of a user is entered into the linking cell such that data cells associated with the linking cell are accessible by the user. For example, in FIG. 1, Paul Hart's e-mail address (phart@xyz.com) has been entered into the linking field associated with the "Human Resources" data cells. Thus, Paul Hart can access the data cells (e.g., January, February, etc.) associated with the "Human Resources" budget.

At optional step 404, an e-mail is sent to the user alerting the user of the user's ability to access the data cells associated with the linking cell. In the example described above, Paul Hart is sent an e-mail alerting him that he may access the data cells associated with the Human Resources budget. At optional step 406, the user creates a password such that the user can limit access to the data cells associated with the user's e-mail address. In the example described above, Paul Hart may create a password to limit access to the Human Resources budget data cells; however, Paul may not be able to limit access to the Human Resources budget data cells from higher level users. Such users may be, for example, users who have access to the entire budget of XYZ Company.

At optional step 408, the user reassigns access rights to at least a portion of the data cells associated with the linking cell to another user. As provided above, Paul Hart has access to the entire Human Resources budget (from the access rights given to him in FIG. 1). In FIG. 2, Paul Hart has reassigned access rights to the Hourly Maintenance, Hourly Operations, and Hourly Secretarial budgets to Javier Yu, and has reassigned access rights to the Union Contractors and Non-Union Contractors budgets to Clifford Barns. Of course, Paul Hart may also retain the ability to access these budget areas.

FIG. 5 is a spreadsheet that is similar to the spreadsheet illustrated in FIG. 1; however, in contrast to including a linking field for each column as in FIG. 1, a single linking field is provided in FIG. 5. In the exemplary embodiment illustrated in FIG. 5, in order to assign access rights to a portion of the data structure (i.e., data cells in the spreadsheet), the data cells are highlighted (e.g., using a mouse), and then an e-mail address is entered into the linking field. Through this operation, access rights to the highlighted data cells are provided to the user corresponding to the e-mail address entered into the single linking field. In FIG. 5, the Office Space column of data cells have been highlighted (i.e., selected). Further, John Brown's e-mail address (i.e., jbrown@xyz.com) has been entered into the linking field associated with the spreadsheet. Thus, John Brown has been given access rights to the Office Space data cells. Naturally, this operation may be continued for multiple access right assignments.

In FIGS. 1-3 and 5, access rights have been provided by entire columns or rows; however, access rights can be provided to any combination of data cells. For example, in FIG. 6 the Marketing and Entertainment Expense data cells have been highlighted for the months of June through August. Waite Hoyt's e-mail address (whoyt@xyz.com) has been entered into the linking field, and as such, Waite Hoyt has been given access rights to the Marketing and Entertainment Expense data cells for the months of June through August.

Figure 7:
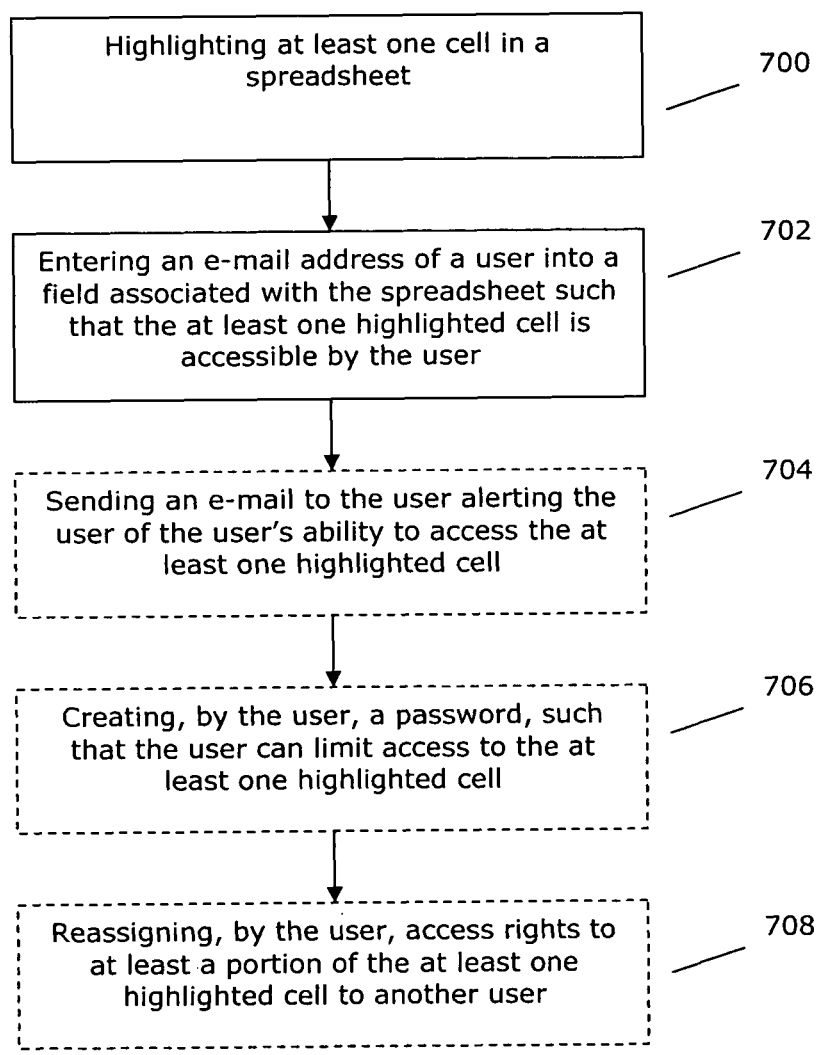
FIG. 7 is a flow diagram illustrating another method of enabling access to a data structure in accordance with another exemplary embodiment of the present invention.

FIG. 7 is a flow diagram illustrating a method of enabling access to a data structure where the data structure is a spreadsheet corresponding to the exemplary spreadsheets illustrated in FIGS. 5-6. At step 700, at least one data cell in a spreadsheet is highlighted. For example, in FIG. 5 the data cells corresponding to the Office Space budget have been highlighted. At step 702, an e-mail address of a user is entered into the linking cell such that the highlighted data cells are accessible by the user. For example, in FIG. 5, John Brown's e-mail address (jbrown@xyz.com) has been entered into the linking field when the "Office Space" data cells have been highlighted/selected. Thus, John Brown can access the data cells (e.g., January, February, etc.) associated with the "Office Space" budget.

At optional step 704, an e-mail is sent to the user alerting the user of the user's ability to access the at least one highlighted data cell. In the example described above, John Brown is sent an e-mail alerting him that he may access the data cells associated with the Office Space budget. At optional step 706, the user creates a password such that the user can limit access to the at least one highlighted data cell. In the example described above, John Brown creates a password to limit access to the Office Space budget data cells; however, John may not be able to limit access to the Office Space budget data cells from higher level users.

At optional step 708, the user reassigns access rights to at least a portion of the at least one highlighted data cell to another user. As provided above, John Brown has access to the entire Office Space budget (from the access rights given to him in FIG. 5). John Brown can reassign access rights to a portion of the Office Space budget to another user.

Figure 8:
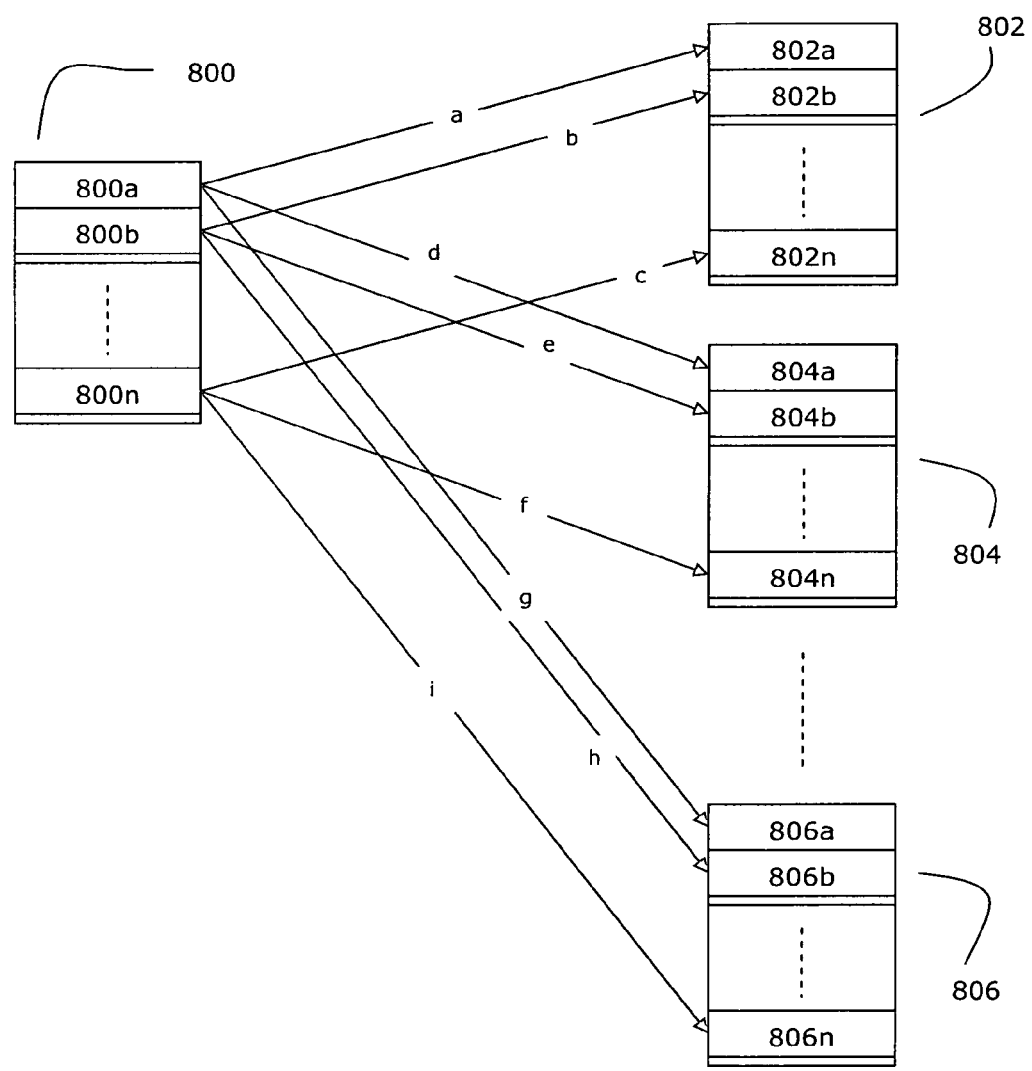
FIG. 8 is a block diagram illustrating association of a data structure including e-mail addresses with other data structures in accordance with another exemplary embodiment of the present invention.

In the exemplary embodiments of the present invention described with reference to FIGS. 1-7, an e-mail address is entered (e.g., typed, copied/pasted, linked) into a linking cell to associate the corresponding section of the data structure (e.g., data cells in a spreadsheet) with the user; however, the present invention is not limited thereto. The e-mail addresses may be associated with the sections of the data structure by any of a number of methods. For example, the e-mail addresses may be linked (e.g., via software) from an external source to the data structure. For example, FIG. 8 illustrates source file 800. Source file 800 includes a listing of e-mail addresses including address 800*a*, address 800*b*, and address 800*n*. Software links the e-mail addresses from source file 800 to data structures 802, 804, and 806.

Data structure 802 (e.g., a spreadsheet) includes sections 802*a*, 802*b*, and 802*n* (e.g., groups of data cells in a spreadsheet). Likewise, data structure 804 includes sections 804*a*, 804*b*, and 804*n*, and data structure 806 includes sections 806*a*, 806*b*, and 806*n*. In the exemplary embodiment of the present invention illustrated in FIG. 8, e-mail address 800*a* is associated with section 802*a* (illustrated through arrow a), section 804*a* (illustrated through arrow d), and section 806*a* (illustrated through arrow g). Likewise, e-mail address 800*b* is associated with section 802*b* (illustrated through arrow b), section 804*b* (illustrated through arrow e), and section 806*b* (illustrated through arrow h), and e-mail address 800*n* is associated with section 802*n* (illustrated through arrow c), section 804*n* (illustrated through arrow f), and section 806*n* (illustrated through arrow i).

Thus, the user corresponding to e-mail address 800*a* has access rights with respect to sections 802*a*, 804*a*, and 806*a* of data structures 802, 804, and 806, respectively. Likewise, the user corresponding to e-mail address 800*b* has access rights with respect to sections 802*b*, 804*b*, and 806*b* of data structures 802, 804, and 806, respectively. Further, the user corresponding to e-mail address 800*n* has access rights with respect to sections 802*n*, 804*n*, and 806*n* of data structures 802, 804, and 806, respectively.

Figure 9:
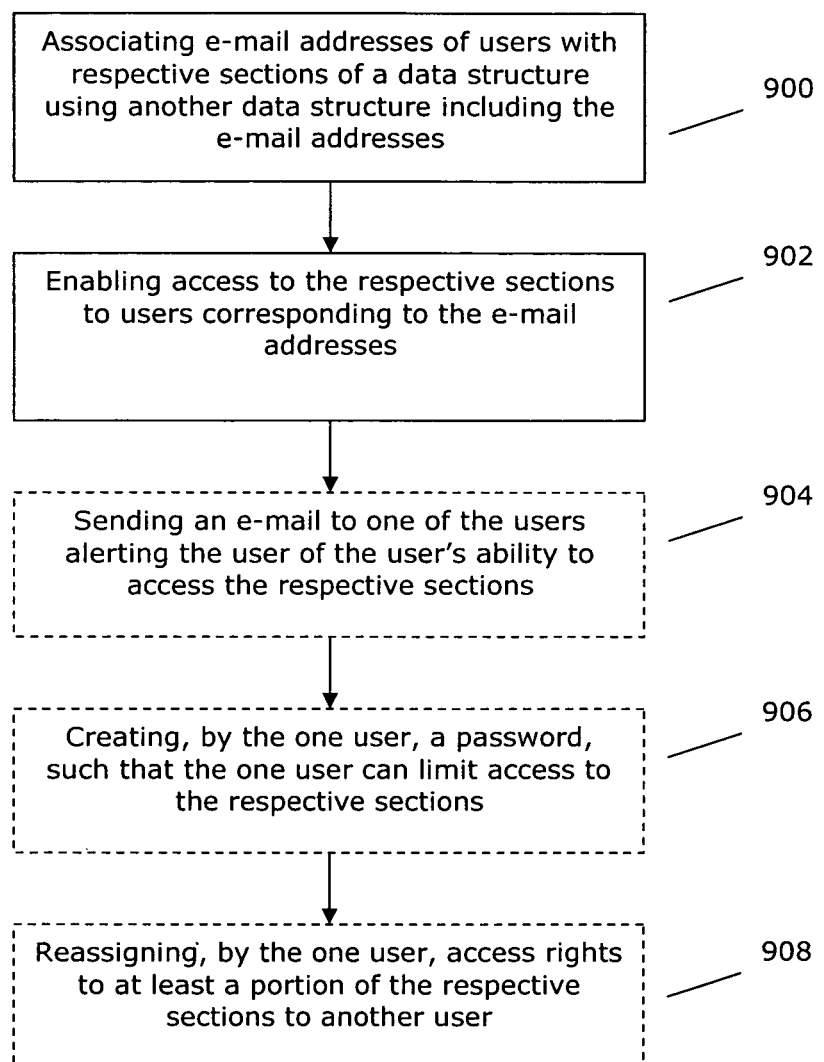
FIG. 9 is a flow diagram illustrating another method of enabling access to a data structure in accordance with another exemplary embodiment of the present invention.

FIG. 9 is a flow diagram illustrating a method of enabling access to sections of a data structure. At step 900, e-mail addresses of users are associated with sections of a data structure using another data structure including the e-mail addresses. For example, in the exemplary embodiment of the present invention illustrated in FIG. 8, e-mail addresses from source file 800 are associated with sections of data structure 802. At step 902, access to the respective sections of the data structure is enabled to users of the corresponding e-mail addresses. Referring again to FIG. 8, access to section 802*a* of data structure 802 is enabled to the user of e-mail address 800*a*.

At optional step 904, an e-mail is sent to one of the users alerting the user of the user's ability to access the respective sections of the data structure. At optional step 906, the user creates a password such that the user can limit access to the respective sections of the data structure. At optional step 908, the user reassigns access rights to at least a portion of the respective sections of the data structure to another user.

Various aspects of the present invention may be accomplished via the Internet. For example, the e-mail addresses of the users can be associated with sections of a data structure via the Internet. Further, the users can access their respective sections of the data structure via the Internet. Further still, the user can set up a password to limit access to the respective sections of the data structure via the Internet.

Although in certain environments it is desirable to conduct certain aspects of the present invention via the Internet, the present invention is not limited thereto. For example, such aspects can be conducted via other means such as a LAN, a WAN, an Intranet, etc.

Although the present invention has been described primarily by reference to data cells in spreadsheets, it is not limited thereto. The methods described herein may be applied to any of a number of types of sections of any of a number of data structures, for example, sections of a relational database, sections of word processing electronic documents, sections of database documents, and sections of software based documents (e.g., C programs, HTML documents, etc.).

Further, while visually represented to a user as a spreadsheet, the underlying data structure being implemented may take on other forms. For example, the data structure may actually be a relational data model including a data structure definition table, a set of column definition tables, a set of row definition tables, and a set of email assignment tables. Each of these tables may exist as data tables in a database. The combination of such features (i.e., data structure definition+column definition+row definition+assignment) may be defined as a data structure that is visually presented to the user as a spreadsheet.

Although the present invention has been described in terms of a method of enabling access rights to sections of a data structure, it is contemplated that the invention could be implemented entirely (or in part) through software on a computer readable carrier such as a magnetic or optical storage medium, or an auto frequency carrier or a radio frequency carrier.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A non-transitory computer readable storage medium including software that is adapted to control a computer to implement a processing method of controlling access to a spreadsheet, said processing method comprising the steps of:
   giving a user access to a single layer of a spreadsheet stored on a server, said single layer having continuous rows and columns and including, a first continuous portion of said single layer and a second continuous portion of said single layer; and
   granting network access to said first portion of said single layer of said spreadsheet to a first sub-user at a first remote location from said server and a second sub-user while denying access to said second portion of said single layer of said spreadsheet to said first sub-user and said second sub-user, and
   granting access to said second portion of said single layer of said spreadsheet to a third sub-user while denying access to said first portion of said single layer of said spreadsheet to said third sub-user,
   permitting said user to visually scroll between said first portion of said single layer and said second portion of single layer along said continuous rows or columns,
   accepting modification of a first cell in said first portion stored on said server by said first sub-user transmitting said modification over said network to said server, and
   accepting further modification of a second cell in said first portion stored on said server by said second sub-user transmitting said further modification over said network to said server,
   reassigning said network access of the third sub-user granted to said second portion of the spreadsheet to another user.

2. A non-transitory computer readable storage medium according to claim 1, wherein said step of granting network access to said first portion of said single layer includes associating address of said first sub-user and said second sub-user to said first portion of said single layer.

3. A non-transitory computer readable storage medium according to claim 1, further comprising the step of sending e-mails to the first sub-user and the second sub-user alerting them that they have been granted network access to the first portion of the single layer.

4. A non-transitory computer readable storage medium according to claim 1, further comprising the step of creating, by the first sub-user, a password, to limit access to the first portion of the single layer.

5. A non-transitory computer readable storage medium according to claim 1, wherein a respective user name is associated with said first sub-user and said second sub-user and access is granted to said first portion and said second portion by identifying said first user name and said second user name, respectively.

6. A non-transitory computer readable storage medium according to claim 1, wherein as said first sub-user modifies said first cell and said second sub-user modifies said second cell, said first sub-user and said second sub-user views said first portion within said server over said network.

7. A non-transitory computer readable storage medium according to claim 1, wherein:
   said first subuser is granted network access to said first portion of said single layer of said spreadsheet at said first remote location from said server; and
   said second subuser is granted network access,
   without transmitting said second portion of said single layer of said spreadsheet from said server and to said first subuser and said second subuser.

8. A method of controlling access to a spreadsheet, said method comprising the steps of:
   giving a user access to a single layer of a spreadsheet stored on a server, said single layer having continuous rows and columns and including a first continuous portion of said single layer and a second continuous portion of said single layer; and
   granting network access to said first portion of said single layer of said spreadsheet to a first sub-user at a first remote location from said server and a second sub-user while denying access to said second portion of said single layer of said spreadsheet to said first sub-user and said second sub-user,
   granting network access to said second portion of said single layer of said spreadsheet to a third sub-user while denying access to said first portion of said single layer of said spreadsheet to said third sub-user,
   permitting said user to visually scroll between said first portion of said single layer and said second portion of said single layer along said continuous rows or columns,
   accepting modification of a first cell in said first portion stored on said server by said first sub-user transmitting said modification over said network to said server, and
   accepting further modification of a second cell in said first portion stored on said server by said second sub-user transmitting said further modification over said network to said server,
   reassigning said network access of the third sub-user granted to said second portion of the spreadsheet to another user.

9. The method of claim 8 wherein said step of granting network access to said first portion of said single layer includes associating address of said first sub-user and said second sub-user to said first portion of said single layer.

10. The method of claim 8 further comprising the step of:
sending e-mails to the first sub-user and the second sub-user alerting them that they have been granted network access to the first portion of the single layer.

11. The method of claim 8 further comprising the step of:
creating, by the first sub-user, a password, to limit access to the first portion of the single layer.

12. A method according to claim 8, wherein a respective user name is associated with said first sub-user and said second sub-user and access is granted to said first portion and said second portion by identifying said first user name and said second user name, respectively.

13. A method according to claim 8, wherein:
said first subuser is granted network access to said first portion of said single layer of said spreadsheet at said first remote location from said server; and
said second subuser is granted network access,
without transmitting said second portion of said single layer of said spreadsheet from said server and to said first subuser and said second subuser.

14. A method according to claim 8, wherein as said first sub-user modifies said first cell and said second sub-user modifies said second cell, said first sub-user and said second sub-user views said first portion within said server over said network.

* * * * *